United States Patent [19]
Babel

[11] Patent Number: 5,346,343
[45] Date of Patent: Sep. 13, 1994

[54] MILLING HEAD
[75] Inventor: Werner Babel, Pfronten, Fed. Rep. of Germany
[73] Assignee: MAHO Aktiengesellschaft, Pfronten, Fed. Rep. of Germany
[21] Appl. No.: 43,351
[22] Filed: Apr. 6, 1993
[30] Foreign Application Priority Data
Apr. 7, 1992 [DE] Fed. Rep. of Germany ....... 9204823
[51] Int. Cl.5 .............................................. B23C 1/12
[52] U.S. Cl. ...................................... 409/201; 409/211
[58] Field of Search ....................... 409/201, 211, 216; 29/27 C; 408/46, 48

[56] References Cited
U.S. PATENT DOCUMENTS

| | | | |
|---|---|---|---|
| 3,359,861 | 12/1967 | Johnson et al. | 409/211 |
| 3,806,691 | 4/1974 | Roach | 409/211 X |
| 3,827,334 | 8/1974 | English et al. | 409/216 X |
| 4,187,601 | 2/1980 | Aldrin | 409/201 |
| 4,589,174 | 5/1986 | Allen | 409/216 |
| 5,222,283 | 6/1993 | Laschet | 29/27 C |

*Primary Examiner*—Z. R. Bilinsky
*Attorney, Agent, or Firm*—Weingarten, Schurgin, Gagnebin & Hayes

[57] ABSTRACT

A milling head is provided having an axially displacable spindle for retaining a machine tool, the spindle being pivotally movable with respect to a workhead, and the lower end of the machine tool lying on the axis of rotation. In a first embodiment, the spindle is rotatably mounted to the workhead via an angular carrier, and the workhead is axially movable. In a second embodiment, the workhead includes guide rails for guiding rotational movement of a plate-shaped structure with respect to the workhead, and the plate-shaped structure includes guides for controlling linear displacement of the angular carrier.

7 Claims, 1 Drawing Sheet

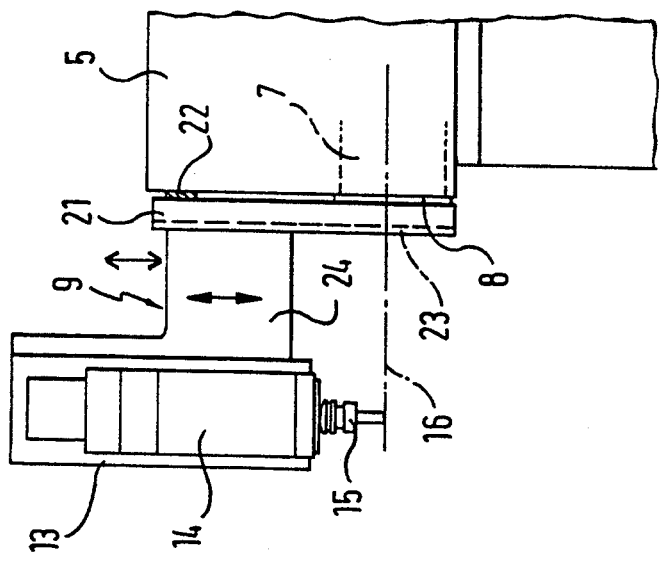
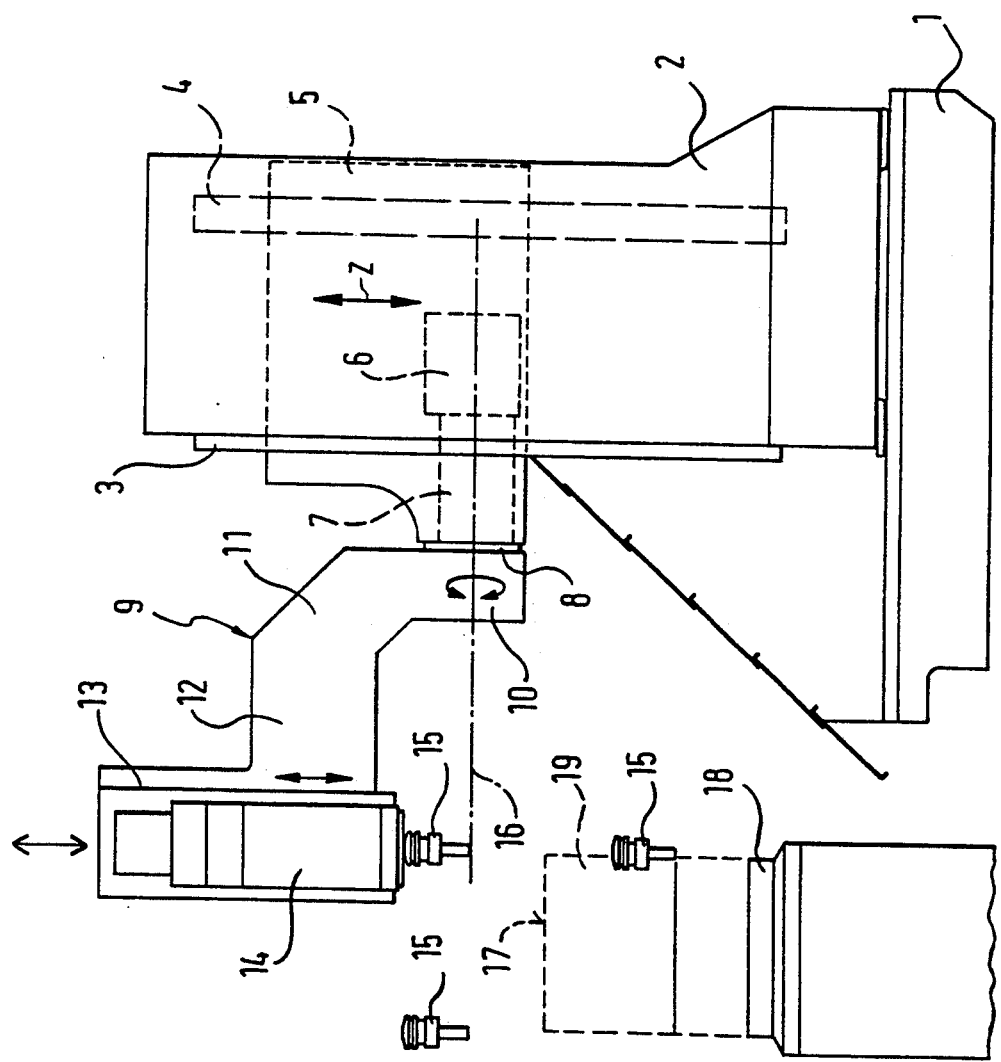

MILLING HEAD

The invention concerns a milling head for a machine tool, which has a housing and in it a working spindle mounted so it can move axially, and the workhead, which can move horizontally on the face, is mounted so it can pivot on a horizontal axis of rotation.

As is known, precision cutting work on edges and corners of a workpiece presents substantial difficulties, because the various machine parts that are driven must execute complicated movements together, so that the effective range of the clamped tool can be moved on a curved radius small enough to go around these corners and edges.

The task of the invention is to create a milling head of the type specified above with which even edges and other critical sections of the workpiece can be processed with precision in a simple way.

The invention solves this task by mounting the housing of the milling head on an angular carrier on the workhead in such a way that the lower end of the clamped tool is in each relative position of the milling head on the axis of rotation.

Because the milling head is held by means of the angular carrier in the invention, a rotational movement on the axis of rotation is executed by twisting the rotational element mounted on the workhead, while the effective working face of the tool remains centered on the axis of rotation and pivots on it.

According to one convenient design of the invention, the dimensionally stable angular carrier is designed in one piece and has a lower section attached to the rotating element of the workhead driven by a motor, as well as an upper section running at a right angle, to which the housing of the milling head is attached diagonally.

In another convenient design of the intention, the carrier consists of two parts, wherein an initial pivoting part attached to the rotating element on the workhead is a guide for the curved second part. This design of the angular carrier makes it possible to align various tool lengths with precision, in addition to the axial feed of the working spindle-during or before a work cycle on the axis of rotation.

The horizontal sections of the angular carrier are chosen so they are long enough and dimensionally stable enough to reach a sufficiently large working range.

Other special features and advantages of the invention will emerge from the following description of examples of embodiment along with the drawings.

FIG. 1 shows a machine tool with a vertical milling head mounted on a workhead in a schematic side view; and FIG. 2 shows a milling head with a two-piece angular carrier.

The machine tool shown in FIG. 1 contains a horizontally moving upright 2 on a bed 1, on whose vertical guides 3,4 a workhead 5 is conveyed so a motor can move it on the Z axis. A drive unit 6 is arranged on the workhead 5, which drives a rotating element 9 on the top of the spindle head 5 via a gear 7 or the like. A bent carrier 9 is mounted on this rotating element 9, which consists of a lower vertical section 10, a diagonal intermediate section 11 and a horizontal upper section 12. The housing 13 of a vertical spindle 14 is attached to this upper horizontal section 12 of the angular carrier 9 which is mounted so it can move axially in the housing 13 in the direction of the arrow 15 by means of a drive medium not shown. The whole arrangement, especially the length of the respective sections 10, 11, 12 of the angular carrier 9 is chosen so that a tool 15 clamped onto the working spindle 14 with its lower end is centered precisely on the axis of rotation 16 of the rotational element 8, so that by turning this rotational element 9 on the axis 16 of the angular carrier 9 and with it the working spindle 14, a rotational movement is executed on this axis 16, wherein at each stage, the lower work surface of the milling cutter 15 remains on this axis 16. Through such a movement, the longitudinal edges 17 of a workpiece 19 clamped onto a work bench 19 can be processed very precisely, wherein such a processing cycle requires only turning the angular carrier 9 with the help of, for example, the drive motor 6 pictured as a step motor. By using a conventional lathe bench as the workpiece carrier, various edges and corners of the workpiece 19 can be processed in this way.

The embodiment in FIG. 2 corresponds in its basic structure to the one in FIG. 1, wherein, but here the milling head is mounted on a workhead 5 that can move horizontally on the upright 2. In this embodiment, the angular carrier 9 consists of a plate 21 arranged on top of the workhead 5, whose lower section is mounted firmly on the rotational element 9 and whose upper part is guided on a curved rail 22 on top of the workhead 5. The plate 21 has guides 23 in front, in which a second part. 24 of the angular carrier 9 is guided in the direction of the arrow. In this way, the face milling cutter 15 in the working spindle 14 can be set precisely on the axis of rotation 16, without the spindle 14 having to be moved axially in the housing 13. The invention is not limited to the examples of embodiment shown. Thus, for example, the angular carrier 9 as in FIG. 1 can be guided over a curved rail 22 also on the face of a workhead 5 designed accordingly, in order to increase the stability and counteract vibrations.

I claim:

1. A milling head for a machine tool for milling longitudinal edges of a workpiece clamped to a work bench, comprising:
    a base;
    a work head mounted on said base for horizontal alignment along a horizontal axis;
    a carrier comprising a unitary element, said unitary element comprising a first section rotatably mounted on said work head for rotation about said horizontal axis and a second section disposed at an angle to said first section;
    a housing mounted on said second section of said carrier;
    a spindle having an upper end and a lower end disposed for reciprocal movement within said housing;
    a tool holder disposed at the lower end of said spindle;
    wherein said carrier and housing are configured such that a tip of a tool in said tool holder is alignable to remain on said horizontal axis during rotation of said carrier about said horizontal axis.

2. The milling head according to claim 1, wherein said first section of said carrier comprises a vertical section and said second section of said carrier comprises a horizontal section, said carrier further comprising a diagonal section interconnecting said vertical section and said horizontal section.

3. A milling head for a machine tool for milling longitudinal edges of a workpiece clamped to a work bench, comprising:
- a base;
- a work head mounted on said base for horizontal alignment along a horizontal axis;
- a curved guide rail disposed on a face of said work head;
- a carrier comprising a plate member and an arm member angularly disposed with respect to said plate member, said plate member having an upper end and a lower end, said lower end rotatably mounted on said work head for rotation about said horizontal axis, and said upper end mounted for rotational travel along said curved guide rail of said work head about said horizontal axis;
- a housing mounted on said arm member of said carrier;
- a spindle having an upper end and a lower end disposed within said housing;
- a tool holder disposed at the lower end of said spindle;
- wherein said carrier and housing are configured such that a tip of a tool in said tool holder is alignable to remain on said horizontal axis during rotation of said carrier about said horizontal axis.

4. A milling head for a machine tool having an upper and a lower end, comprising:
- a milling head housing;
- a working spindle having an end adapted for clamping said upper end of said machine tool, said working spindle housed within said milling head housing;
- a workhead movable along a first axis; and
- a unitary angular carrier, having
  - a first end secured to said milling head housing; and
  - a second end pivotally mounted to said workhead about a second axis orthogonal to said first axis,
- wherein said working spindle is reciprocally movable within said milling head housing for positioning said machine tool whereby said lower end of said machine tool is capable of lying on said second axis.

5. The milling head of claim 4, further comprising a rotational element for rotating said angular carrier about said second axis, and wherein said unitary angular carrier further comprises:
- a first section coupled to said rotational element;
- a second section secured to said milling head housing; and
- a third section connecting said first section to said second section.

6. A milling head for a machine tool having an upper and a lower end, comprising:
- a milling head housing;
- a working spindle having an end adapted for clamping said upper end of said machine tool, said working spindle housed within said milling head housing;
- a workhead having a curved guide rail and a plate-shaped part, said guide rail allowing said plate-shaped part to move rotationally with respect to said workhead, said plate-shaped part including a guide; and
- an angular carrier having a first end secured to said milling head housing and a second end linearly movable within said guide of said plate-shaped part,
- wherein said lower end of said machine tool is adjustable to lie on said second axis.

7. The milling head for a machine tool of claim 3, wherein said plate member of said carrier further comprises a guide member for guiding said carrier in translational movement with respect to said work head.

* * * * *

UNITED STATES PATENT AND TRADEMARK OFFICE
CERTIFICATE OF CORRECTION

PATENT NO. : 5,346,343
DATED : September 13, 1994
INVENTOR(S) : Werner Babel

It is certified that error appears in the above-indentified patent and that said Letters Patent is hereby corrected as shown below:

Column 1, line 60, "rotating element 9" should read --rotating element 8--.

Column 2, line 13, "19 can" should read --18 can--.

Column 2, line 26, "element 9" should read --element 8--.

Signed and Sealed this

Fourteenth Day of March, 1995

Attest:

BRUCE LEHMAN

*Attesting Officer*    *Commissioner of Patents and Trademarks*